United States Patent [19]

Canaud et al.

[11] Patent Number: 4,773,678
[45] Date of Patent: Sep. 27, 1988

[54] CONNECTING PART BETWEEN A RIGID MECHANICAL ELEMENT AND A HOSE

[75] Inventors: Michel Canaud, Paris; Philippe Dewitte, Thuorotte, both of France

[73] Assignee: Saint-Gobain Vitrage "Les Miroirs", Courbevoie, France

[21] Appl. No.: 68,165

[22] Filed: Jun. 30, 1987

[30] Foreign Application Priority Data

Jul. 4, 1986 [FR] France ................. 86 09734

[51] Int. Cl.[4] ............................................. F16L 33/20
[52] U.S. Cl. ..................................... 285/39; 285/253; 285/258
[58] Field of Search ............... 285/253, 243, 258, 252, 285/39

[56] References Cited

U.S. PATENT DOCUMENTS

| | | | |
|---|---|---|---|
| 1,532,596 | 4/1925 | Madsen | 285/253 X |
| 2,015,081 | 9/1935 | McElhany et al. | 285/242 |
| 2,071,478 | 2/1937 | Wick | 285/258 |
| 2,315,897 | 4/1943 | Hansell | 285/253 X |
| 3,211,476 | 10/1965 | Wagner | 285/258 |
| 3,495,855 | 2/1970 | Curvie | 285/253 |
| 4,212,487 | 7/1980 | Jones et al. | 285/243 X |

Primary Examiner—Thomas F. Callaghan
Attorney, Agent, or Firm—Oblon, Fisher, Spivak, McClelland & Maier

[57] ABSTRACT

The invention relates to a connecting part between a rigid mechanical element and a hose in which a fluid at high pressure travels. The connecting part has a hollow tubular part B enlarged at one end into a head (1) and driven into a hose A, an internal locking pipe C in the hollow tubular part B, and a clamp D.

8 Claims, 3 Drawing Sheets

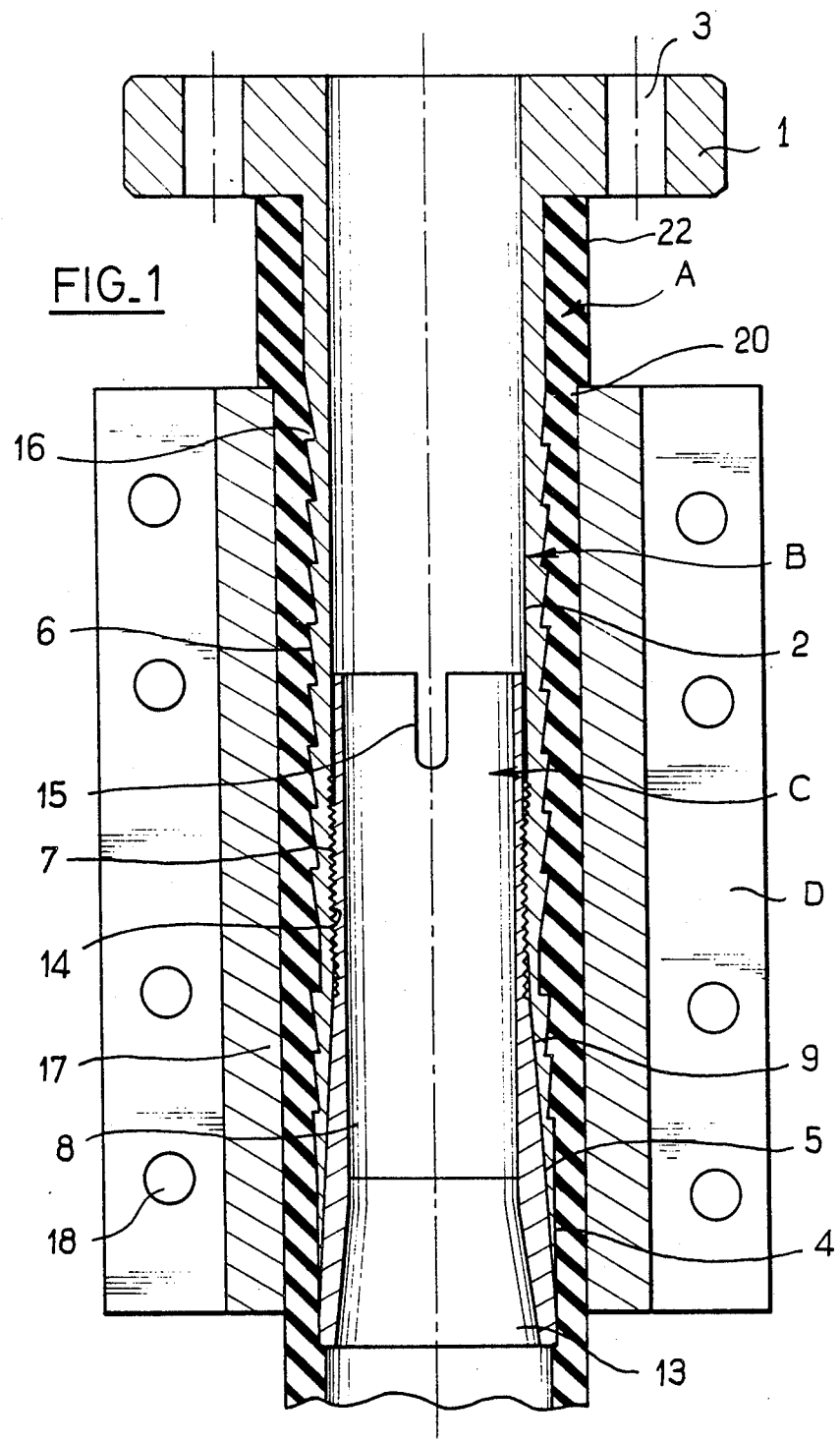
FIG_1

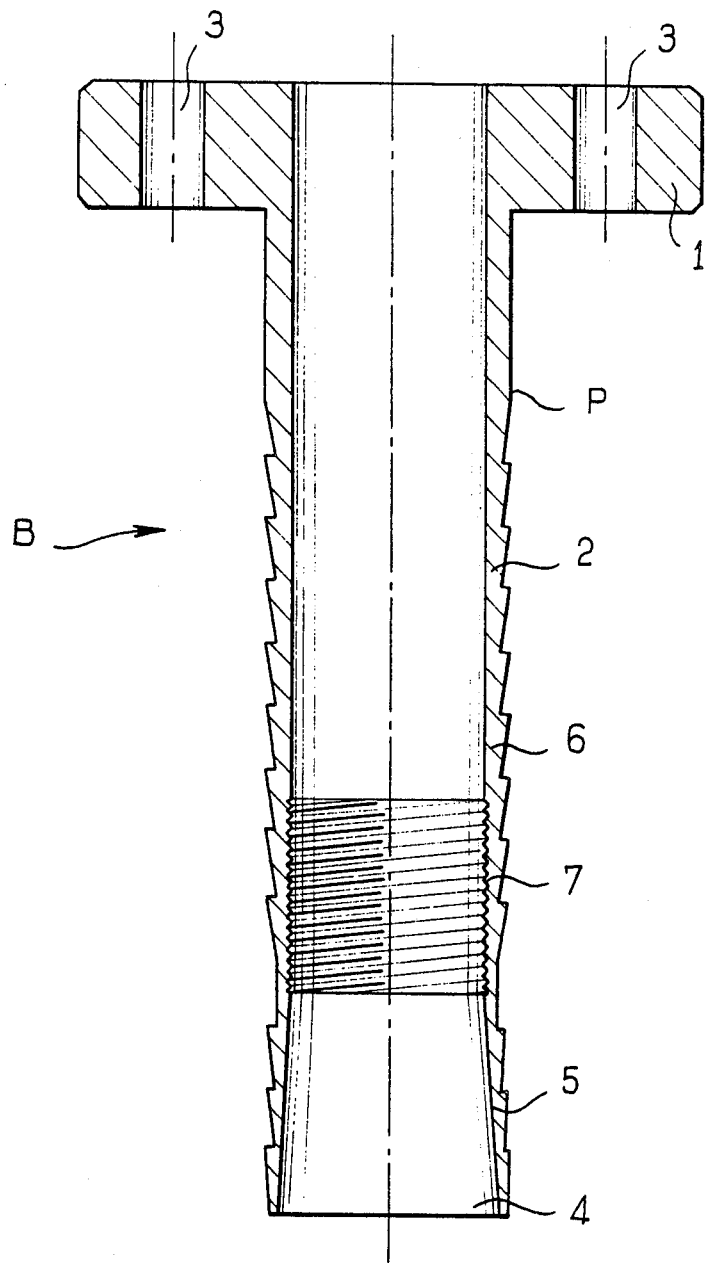
FIG_2

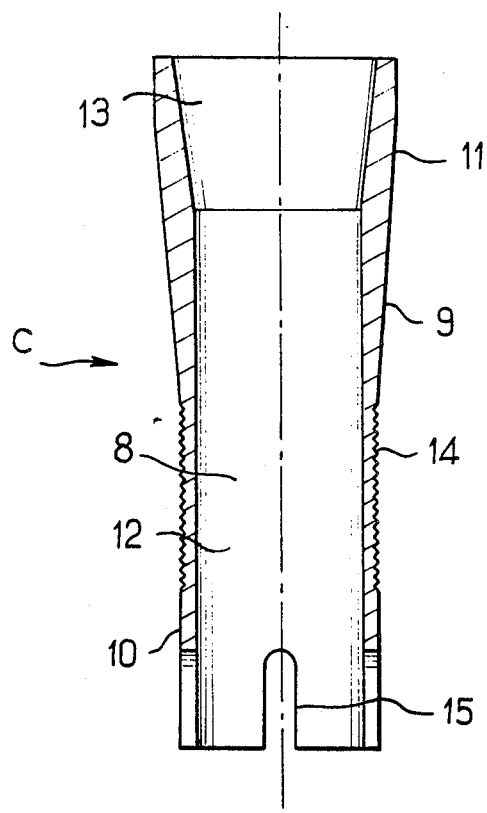
FIG_3
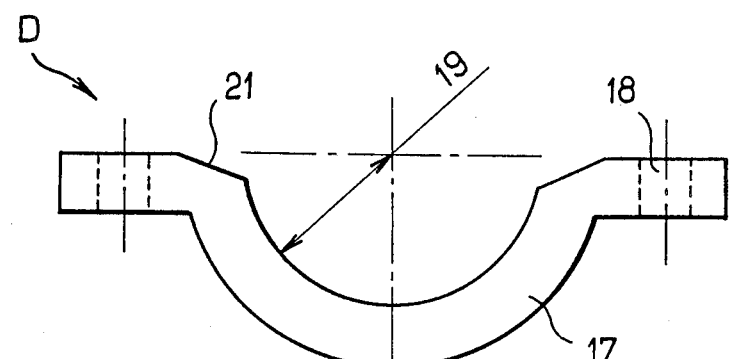
FIG_4

CONNECTING PART BETWEEN A RIGID MECHANICAL ELEMENT AND A HOSE

FIELD OF THE INVENTION

The invention relates to a connecting part between a rigid mechanical element and a hose in which a fluid under high pressure travels.

BACKGROUND OF THE INVENTION

For the routing of fluids at relatively high temperature, for example greater than 100° C., and under a high pressure, for example at 8000 kilopascals (80 bars), it is common practice to use hoses connecting, for example, the material outlet of a pumping element placed above the drum of material at the intake of the element for distribution and/or processing of the fluid. By fluid, and in the remainder of this specification, is meant products generally exhibiting a great viscosity such as petroleum oils, thermoplastics, for example with a rubber base or more particularly with a polyisobutylene and/or butyl rubber base, all materials applied particularly in the automobile and glass industries. Practically solid at ambient temperature—a polyisobutylene and/or butyl rubber with a molecular weight of 8000 to 15,000 according to STANDINGER having for example a viscosity close to 115° Mooney at the end of eight hours and at 40° C.—these materials must be worked at temperatures often considerably higher than 100° C.—and then also exert pressures sometimes greater than 30,000 kilopascals. When these fluids are distributed by means of hoses, consisting of rubber tubes inside and outside reinforced with a central metal mesh, for reasons of safety and of technology small-diameter hoses, less than 100 mm, connected at their intake and outlet are used in the following manner. The metal mesh is first of all stripped over several centimeters, then a connecting part consisting of two metal elements is made to penetrate with force with a press. The first element consists of a hollow tube whose outside diameter corresponds to the inside diameter of the hose and with a tapered truncated end. It is extended at its other end by a portion with a larger outside diameter forming a base.

The tube is provided in the vicinity of this base with an outside thread on which is screwed the second element consisting of a flange striking against the base. This flange is extended by a second threaded portion whose inside diameter corresponds to the diameter of the hose. When the connecting part is put in place, an operation that is facilitated by the tapered shape of the tube, this second threaded portion of the flange is screwed to the stripped metal mesh of the hose. In addition, for a better seal, the thread carried by the hollow tube has a length greater than that necessary for the screwing of the flange to the hollow tube, so that the latter is partially screwed into the inside rubber tube of the hose.

Such a connection exhibits a weak point at the level of the tapered end of the hollow tube, the fluid routed by the hose exerting a very great pressure because of the narrowing of the section. Experimentally, breaks of connections have been found for pressures exceeding 8500 kilopascals with hoses of more than 700 mm². This technical limitation is all the more bothersome—as previously indicated—as the technology of hoses makes it possible for the same sections to withstand pressures higher than 30,000 kilopascals. In addition, this type of connection has a delicate assembly which can be performed only in a factory. In practice, the manufacturer of hoses provides them with connections, which is not always fully satisfactory for the user (who, for example, for the development of new machines) desires to have connections which he can assemble at will.

A connecting part for a rubber hose is also known from U.S. Pat. No. 2,071,478. This connecting part consists of a first element forming a base on which a valve, for example, is screwed. This tubular element is driven by force into the rubber hose and is provided with teeth which oppose its being pulled out. In addition, its end that penetrates into the rubber hose is slit so as to open in two faces when a second tubular element is introduced into it by screwing on the inside of the first tubular element. To prevent the rubber hose from expanding too much, its end is preferably equipped with a brass collar.

This type of connection brings about a reduction, by more than half, of the passage section for the fluid travelling in the rubber hose. In addition, the second tubular element penetrates inside the rubber hose farther than the first tubular element, so that when the fluid travels in the direction of the base, it exerts a strong pressure on the first tubular element which has a tendency to be ejected. This ejection does not occur when the fluid travels from the base toward the rubber hose, but the connections are necessary at each end of the rubber hose, and this very considerable narrowing of the fluid passage section, a true bottleneck, is still maintained, so that this type of connection does not make it possible to withstand very high pressures much greater than 80 bars, for example.

OBJECT OF THE INVENTION

The invention has as its object a connecting part between a rigid mechanical element and a hose able to withstand very high working pressures for example, greater than 30,000 kilopascals. The invention also has its object a simplified assembly connection.

SUMMARY OF THE INVENTION

A connecting part according to the invention comprises three elements assembled around the hose: a hollow tubular part enlarged at one end into a cylindrical head and driven into the hose, an internal locking pipe placed in the hollow tubular part, and a clamp.

The internal locking pipe has a tapered enlarged end approximately of the same outside diameter as the inside diameter of the rubber tube of the hose. Thus, the fluid can travel only through the internal locking pipe. Preferably, the fluid passage section at the level of the enlarged end is not very different from the passage section in the hose, this passage section then gradually narrowing to avoid a throttling of the fluid at high pressure.

The hollow tubular part is essentially characterized in that it carries on its periphery gripping elements for lodgment in the inside rubber tube of the hose and at its end opposite the head a tapered portion slit at its top so as to open slightly when the internal locking pipe is forced to advance in the tubular part.

BRIEF DESCRIPTION OF THE DRAWINGS

Other advantages and characteristics of the invention are detailed in the description of a preferred embodiment of the invention, given below with reference to the accompanying drawings, which represent:

FIG. 1: an overall diagram of a connection according to the invention having essentially a hose, an internal locking pipe, and a clamp;

FIG. 2: a diametral section of the hollow tubular part represented in FIG. 1;

FIG. 3: a diametral section of the internal locking pipe of FIG. 1; and

FIG. 4: a plan view of the outside collar.

DETAILED DESCRIPTION OF THE PRESENTLY PREFERRED EMBODIMENT

According to the invention, the connection is made by the cooperation of four elements which contribute to its fluidtightness; a hose A itself, a hollow tubular part B enlarged at one end into the, for example, a cylindrical head 1 and driven into hose A, an internal locking pipe C, and an outside collar D holding the unit.

The hose A has, for example, two concentric flexible rubber tubes, separated by a reinforcement made of a metal mesh and, preferably, is clad with a thermostatted resistance. This type of hose is capable of withstanding considerable pressures, on the order of, for example, 30,000 kilopascals for a passage section equal, for example, to 1200 $mm^2$ and an outside diameter of 55 mm. To use the connector according to the invention, the hose A is merely cut to the desired length, without stripping by, for example, using a hacksaw.

The hollow tubular part B, shown in detail in FIG. 2, has a straight section 2, whose outside diameter corresponds to the inside diameter of the hose A and whose inside diameter is constant. The hollow tubular part B is enlarged at one end, for example, into the cylindrical head 1, which is provided with calibrated holes 3 for fastening of the connector, by bolting or other equivalent means, to a metal element such as, for example, the element for pumping or for distribution of the fluid traveling through the hose A. The end 4 of the hollow tubular part B opposite the cylindrical head 1 has a slightly tapered inside section that steadily widens in the direction away from the cylindrical head 1. The tapered section of the hollow tubular part is slit, for example four times, over its entire height, so that the four faces 5 thus formed can open in a corolla which assures the locking of the hollow tubular part B in the hose A. This locking is further improved if, preferably, from the tapered end to a point P located near head 1 (i.e., for example, on more than three-fourths of straight section 2) the periphery of the hollow tubular part B whose outside diameter corresponds to the inside diameter of the opening section of the hose A is machined to form teeth 6 there. These rather broad teeth 6 (for example, 10 mm high) make possible a gripping of the hollow tubular part B in the hose by penetrating into the inside rubber tube of the hose A. Other means equivalent to these machined teeth can be used, such as a thread with a pitch on the order of the height of the teeth. Thanks to these teeth 6—or to this thread—the penetration of the hollow tubular part B is relatively easy, and it is not necessary to use a drawing press, a simple weight being necessary at most.

This hollow tubular part B is further provided on the inside with a fine thread 7 machined in its straight section. The fine thread 7 goes to the base of the tapered portion. The fine thread 7 is intended for the assembly of the internal locking pipe C described in more detail with reference to FIG. 3.

The internal locking pipe C consists of a hollow tube 8 that can be placed in the hollow tubular part B and that contains a fluid circulation channel 12. Its outside shape 9 makes possible its perfect fitting inside the the hollow tubular part B. Therefore, it also exhibits a straight section 10 and a tapered section 11 that steadily widens. The tapered section 11 has a maximum diameter equal to the inside diameter of the hose A. The internal locking pipe C therefore assures a perfect continuity of the tube as is seen in FIG. 1. In locking position, the internal locking pipe C even penetrates slightly into the rubber hose A, which assures fluidtightness, the fluid being able to travel only through the internal locking pipe C.

On the other hand, the fluid circulation channel 12 itself exhibits an enlarged section 13 in the tapered section, to facilitate the circulation of the fluid whose pressing section is thus continuously narrowed.

Let us return to the periphery of the internal locking pipe C, where we find a fine machined thread 14 along the straight section 10 and corresponding exactly to the fine thread of the hollow tubular part B. Finally, to screw inside the internal locking pipe C into the hollow tubular part B with a tool (for example, a cross-headed tool), the end of the internal locking pipe C opposite the tapered end is preferably provided with notches 15, shown here as four in number.

To assemble the connector, the hose A is first of all cut to the desired length. The internal locking pipe C is then placed by a quick screwing into the hollow tubular part B, the internal locking pipe C being introduced by the end 4 of the hollow tubular part B. The hollow tubular part B is then driven into the rubber inside tube 16 of the hose A. Optionally, the strength of the hollow the connector can be further improved with a welding of tubular part B to the metal mesh of the hose A. This step accomplished, the internal locking pipe C is positioned precisely, thanks to the cross headed tool, in the hollow tubular part B by gaining access to the internal locking pipe C, this time by the cylindrical head 1 of the hollow tubular part B. By screwing the internal locking pipe C, the tapered portion is compressed more strongly, causing the slit faces 5 to separate, thus providing a perfect fluidtightness. Finally, to hold the unit, the outside collar D shown in FIG. 4 is attached.

The outside collar D is formed from two half-flanges 17 bolted to one another via holes 18. Preferably, the half-flanges 17 have an inside diameter 19 less than or equal to the outside diameter of the hose A so that, as can be seen in FIG. 1 under reference 20, the hose A is compressed and the outside collar D is driven into the rubber outside tube 22 of the hose A. To prevent the hose A thus pinched from being cut, the half-flanges 17 preferably have bevelled edges 21.

The connector thus fastened, the assembly (for example, on the pumping element) can continue in a normal way, since it involves metal part against metal part connectors namely, the rigid cylindrical head 1 against any other element upstream or downstream from the hose. The connector can optionally be thermostatted, just like the hose A, according to usual techniques. Actually, a constant temperature is necessary for the routing of certain products such as, for example, rubbers with a polyisobutylene base used to make multiple glazings.

It should be noted that, in a very advantageous way, the narrowings of the fluid passage section are gradual and that the pressure drops at the level of the connector remain very small.

The embodiment developed described above should not be understood as limiting the invention.

Thus, it has already been indicated that the hollow tubular part B can be provided on its periphery, not with teeth 6, but with a thread along a helix of wide pitch or other equivalent gripping means intended to simplify the penetration of the hollow tubular part B in the hose. If necessary, the hollow tubular part B can be smooth. In this case, its positioning is assured by the pressure of the fluid traveling in the hose A and causing the opening in a corolla of the faces 5 of the end 4 of the hollow tubular part B. The system therefore generates its own fluidtightness, which is all the more assured the greater the inside pressure exerted by the fluid.

On the other hand, with the fine threads 7, 14 carried by the hollow tubular part B and the internal locking pipe C, other means for fastening or even merely for holding the internal locking pipe C in the hollow tubular part B can be substituted. Actually, when the fluid travels from the tapered end in the direction of the head, it exerts on the tapered end, encountered in the first place, of the internal locking pipe C a very strong pressure because of the narrowing of the passage section. This pressure is sufficient to cause the internal locking pipe C to advance slightly and thus to assure the fluidtightness and locking of the hollow tubular part B. In this case, the cross notches provided for the crossheaded tool, of course, are useless, even in the presence of threads. These notches can, however, be replaced with any other equivalent screwing means, and that make possible a simple access to the internal locking pipe C already placed in the hollow tubular part B.

A connector according to the invention is preferably made from a material easy to machine very precisely and that is non-corrodible.

Such a connector holds with fluids traveling at more than 100° C., under a pressure greater than 8500 kilopascals and even at 30,000 kilopascals. Thus with a hose marketed by the NORMYDRO company under the reference FC 195/24, to obtain a bead for multiple glazings it was possible to route, for 800 hours, a polyisobutylene and butyl rubber, having a molecular weight of 8000 to 15000 according to STANDINGER and having at 40° C. a viscosity close to 155° Mooney (measured with a Mooney shearing disk viscometer according to the recommendation ASTM D 1646-74) and exerting a pressure of close to 30,000 kilopascals.

What is claimed is:

1. Apparatus for connecting a rigid mechanical element to a hose in which, during use of said apparatus, fluid travels at high pressure, said apparatus comprising:
   (a) a hollow tubular part having a first end, a second end, and an enlarged head at its first end, said enlarged head being adapted to be mounted on a rigid mechanical element and said second end of said hollow tubular part being sized and shaped to be inserted into a hose during use of said apparatus;
   (b) an internal locking pipe having a first end and a second end, said first end of said internal locking pipe being sized and shaped so that it can be inserted into said second end of said hollow tubular part in peripheral abutting contact therewith and the external periphery of said internal locking pipe being tapered outwardly towards its second end so that, when said first end of said internal locking pipe is inserted into said second end of said hollow tubular part during use of said apparatus, said second end of said internal locking pipe makes peripheral abutting contact with the internal periphery of the hose beyond said second end of said hollow tubular part; and
   (c) a clamp sized and shaped so that, during use of said apparatus, the internal periphery of said clamp makes peripheral abutting contact with the external peripheral surface of the hose over at least said second end of said hollow tubular part and said first end of said internal locking pipe.

2. Apparatus as recited in claim 1 wherein said hollow tubular part is provided over at least a part of its external periphery with griping elements adapted to grip the inner peripheral surface of the hose during use of said apparatus.

3. Apparatus as recited in claim 2 wherein said griping elements are in the form of teeth.

4. Apparatus as recited in claim 1 wherein:
   (a) the internal periphery of said hollow tubular part is tapered outwardly toward said second end of said hollow tubular part and
   (b) a plurality of axial slits are formed in said hollow tubular part beginning at said second end thereof.

5. Apparatus as recited in claim 1 wherein:
   (a) an internal thread is formed in the inner peripheral surface of said hollow tubular part and
   (b) a corresponding external thread is formed in the outer peripheral surface of said internal locking pipe,
   whereby, during use of said apparatus, said internal locking pipe is screwed into said hollow tubular part.

6. Apparatus as recited in claim 1 wherein the internal peripheral surface of said internal locking pipe is tapered outwardly toward said second end of said internal locking pipe.

7. Apparatus as recited in claim 1 wherein a plurality of axial notches are formed in said internal locking pipe beginning at said first and thereof.

8. Apparatus as recited in claim 1 wherein said clamp is formed from two half-flanges each of which has a beveled edge the internal diameter of which is less than or equal to the external diameter of the hose with which said apparatus is to be used.

* * * * *